(12) United States Patent
Mau et al.

(10) Patent No.: US 8,162,539 B2
(45) Date of Patent: Apr. 24, 2012

(54) SENSOR ARRANGEMENT FOR TEMPERATURE MEASUREMENT

(75) Inventors: Gert Mau, Aidlingen (DE); Christoph Raab, Stuttgart (DE); Gerold Stauss, Villingen-Schwenningen (DE)

(73) Assignee: SITRONIC Ges. Fuer Elektrotechnische Ausrüstung mbH & Co. KG, Gaertringen (DE)

(*) Notice: Subject to any disclaimer, the term of this patent is extended or adjusted under 35 U.S.C. 154(b) by 589 days.

(21) Appl. No.: 11/990,420

(22) PCT Filed: Jun. 29, 2006

(86) PCT No.: PCT/DE2006/001121
§ 371 (c)(1),
(2), (4) Date: May 14, 2009

(87) PCT Pub. No.: WO2007/019817
PCT Pub. Date: Feb. 22, 2007

(65) Prior Publication Data
US 2009/0316751 A1    Dec. 24, 2009

(30) Foreign Application Priority Data
Aug. 13, 2005   (DE) .................. 10 2005 038 466

(51) Int. Cl.
*G01K 7/00* (2006.01)
(52) U.S. Cl. ........................ 374/170; 374/208
(58) Field of Classification Search .............. 374/163, 374/170, 179, 208
See application file for complete search history.

(56) References Cited

U.S. PATENT DOCUMENTS

| | | |
|---|---|---|
| 5,046,858 A * | 9/1991 | Tucker .................... 374/179 |
| 6,257,758 B1 | 7/2001 | Culbertson |
| 6,880,970 B2 * | 4/2005 | Mirov .................... 374/208 |
| 7,513,686 B2 * | 4/2009 | Schaffer .................. 374/179 |
| 2003/0223474 A1 | 12/2003 | Roepke |
| 2005/0178200 A1 | 8/2005 | Stauss et al. |
| 2007/0147473 A1 * | 6/2007 | Wolkin et al. ............ 374/208 |
| 2010/0195696 A1 * | 8/2010 | Ishikawa et al. ......... 374/208 |
| 2011/0002358 A1 * | 1/2011 | Sato et al. ............... 374/163 |

FOREIGN PATENT DOCUMENTS

| | | |
|---|---|---|
| DE | 198 16 941 A1 | 10/1999 |
| DE | 102 14 368 A1 | 10/2003 |
| DE | 103 15 519 A1 | 11/2003 |
| DE | 699 07 493 T2 | 3/2004 |
| DE | 102 14 368 B4 | 9/2007 |
| EP | 1 380 481 A2 | 1/2004 |
| GB | 2 208 930 A | 4/1989 |
| JP | H05-045234 | 2/1993 |
| JP | H09-114314 | 5/1997 |
| JP | 09210802 A | 8/1997 |
| JP | 2004-163291 | 6/2001 |
| JP | 2003-202311 | 7/2003 |
| JP | 2003-307457 | 10/2003 |
| WO | WO 2006/108367 A1 | 10/2006 |

* cited by examiner

*Primary Examiner* — G. Bradley Bennett
(74) *Attorney, Agent, or Firm* — Walter A. Hackler

(57) ABSTRACT

In a sensor arrangement (1) for measuring the temperature of a surface, in particular of a pane (2), comprising a temperature sensor (3) that is disposed on a circuit board (4) and positioned at a front end of the circuit board (4) in the direct vicinity of the surface, a flexible heat conducting element (7) is provided between the surface and the circuit board (4).

10 Claims, 1 Drawing Sheet

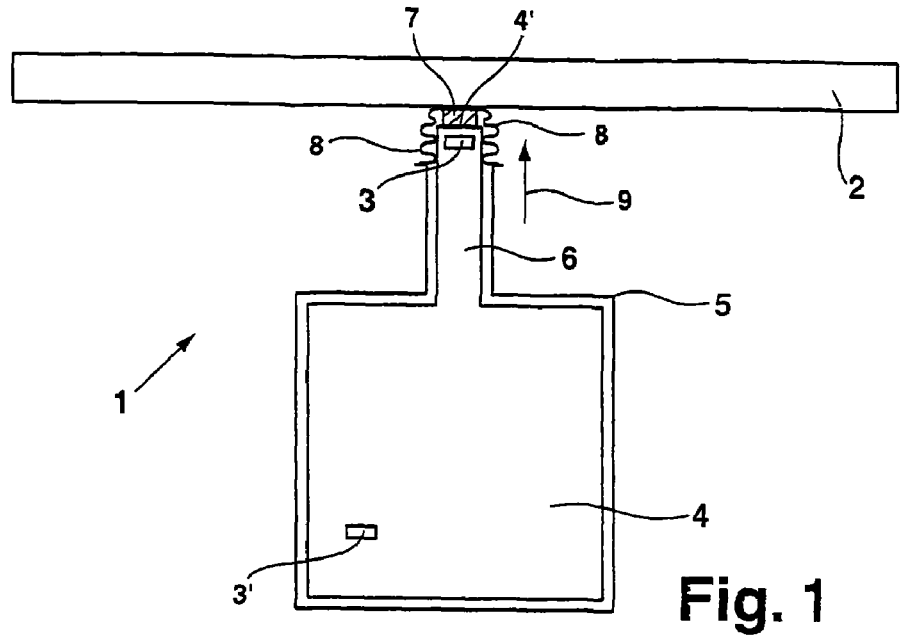
Fig. 1
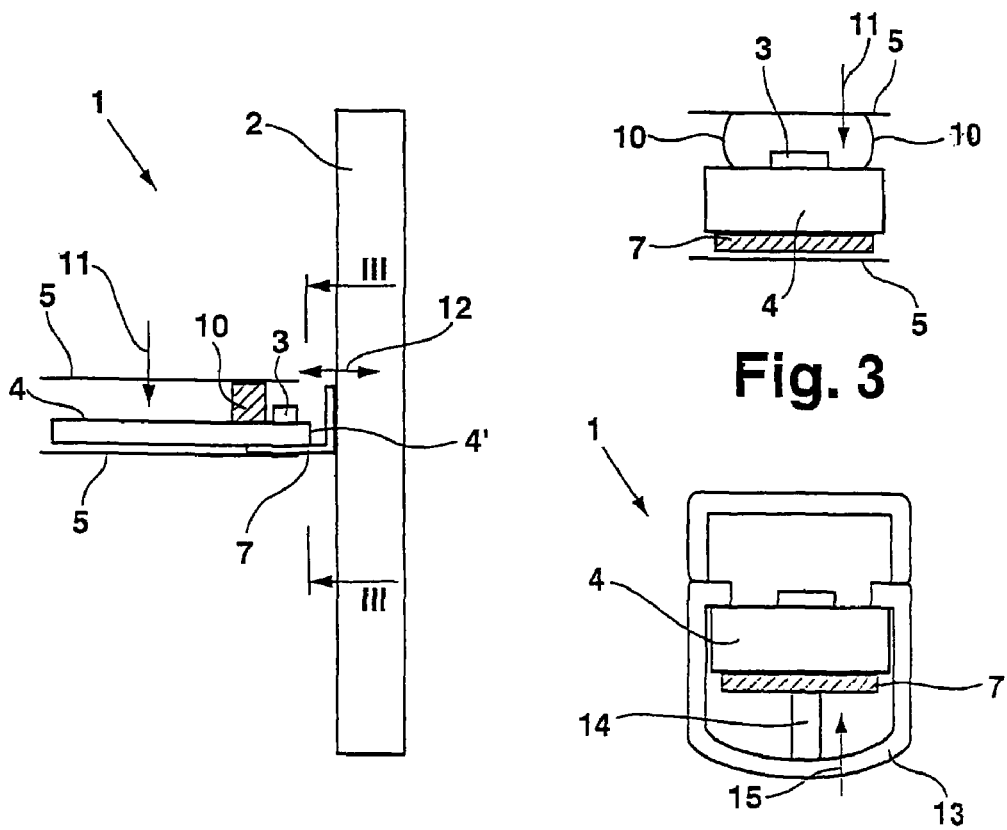
Fig. 2
Fig. 3
Fig. 4

SENSOR ARRANGEMENT FOR TEMPERATURE MEASUREMENT

The invention relates to a sensor arrangement for measuring the temperature of a surface.

Various sensor arrangements of this type, preferably for measuring the temperature of approximately planar surfaces, are known in the art.

The document DE 699 07 493 T2 discloses a surface temperature sensor, wherein a heat conducting surface contact part is pressed against the surface to be measured by means of a spring. The surface contact part contains a temperature sensor that is attached in an electrically insulated fashion.

The document DE 102 27 454 A1 discloses a contact temperature sensor, wherein an attaching part is connected in a thermally conducting fashion to the surface to be measured by means of a heat conducting foil and heat conducting paste. A temperature sensor is coupled to the attaching part by means of a further heat conducting foil.

It is the underlying purpose of the invention to provide an inexpensive sensor arrangement for detecting the temperature of an approximately planar surface, in particular, of a pane.

SUMMARY OF THE INVENTION

This object is achieved in accordance with the invention by the sensor arrangement of claim 1. The dependent claims represent preferred embodiments of the invention.

The inventive sensor arrangement for measuring the temperature of a surface comprises a temperature sensor that is disposed on a circuit board and is positioned in the area of an end face of the circuit board in the direct vicinity of the surface, wherein a flexible heat conducting element is disposed between the surface and the circuit board. Mounting of the temperature sensor directly on the circuit board reduces the costs of the sensor arrangement, since no additional connecting elements are required. The circuit board is connected to the surface via a heat conducting element, wherein the end face of the circuit board is preferably directed approximately parallel to the surface. For this reason, heat can be transferred from the surface to the circuit board and from there to the temperature sensor. The heat conducting element is designed to be flexible, such that it can accept mechanical stress, thereby preventing damage to the circuit board or temperature sensor during installation, removal, or operation.

In a particularly preferred embodiment, the flexible heat conducting element has a front side that is in contact with the surface to be measured and a side that is in flat contact with the circuit board.

The front side of the flexible heat conducting element is preferably designed to have a smooth surface that is rounded at least at the edges. This ensures that the sensor arrangement can be slidably displaced or turned along the surface to be measured, which is advantageous, in particular, for installation or removal of the sensor arrangement, e.g. when the circuit board is mounted via a bayonet catch.

In a preferred further development, the flexible heat conducting element consists of a metal having good heat conducting properties, in particular, copper, aluminum or an alloy, in particular brass or bronze. In this case, heat transfer from the flexible heat conducting element to the circuit board is particularly facilitated. Heat conductors of these materials are moreover particularly inexpensive to produce.

In a particularly preferred further development, the heat conducting element has a resilient element. It is fixed to one end of the housing and ensures that the front side of the heat conductor is pressed to the surface to be measured.

In another preferred further development, the circuit board and the heat conducting element are pressed flatly against each other. The force is thereby selected, in particular, such that the circuit board and the heat conductor tightly abut each other, at the same time permitting displacement of the heat conductor with respect to the circuit board.

In another advantageous further development, the contact pressure between the circuit board and the heat conductor is generated by a resilient element that is located in or formed by the sensor housing.

In a particularly preferred embodiment, the circuit board is metalized on the end face and/or on the side opposite to the temperature sensor and/or on the side surfaces. The metallization ensures good heat conductivity. The metallization can simultaneously be used for electric contact with the temperature sensor. The metallization of the front end may thereby, in particular, be connected to a terminal of the temperature sensor.

In a further development, through connections are provided in the circuit board in the vicinity of the temperature sensor. These are usually designed as metalized bores through the circuit board, which electrically and thermally connect the temperature sensor to the lower side of the circuit board which has a preferably flat metallization in the present case.

In a preferred embodiment, an evaluation unit is additionally mounted to the circuit board, such that a common assembly can be used for measurement as well as for evaluation.

In another advantageous further development, a further temperature sensor is provided on the circuit board in the indirect vicinity of the surface to be measured, which determines by approximation the temperature of the sensor housing or of the interior.

In another particularly advantageous further development, the measured value of the temperature sensor, which is located in the direct vicinity of the surface to be measured and the measured value of which corresponds to the temperature of the surface to be measured, is corrected with the measured value of the second temperature sensor. The final heat conductance value of the heat conductor and of the circuit board can thereby be compensated for.

In a further preferred embodiment, further sensors, in particular temperature sensors, humidity sensors or light sensors, are mounted to the circuit board. In this case, the circuit board is preferably mounted in the interior of a vehicle and is used to measure the temperature of the front screen. Towards this end, it can preferably be integrated in a rear mirror foot as housing. Simultaneous measurement of the screen surface temperature, the interior temperature, and the air humidity using the corresponding sensors enables to use the sensor configuration e.g. to measure fogging-up of the screen.

Further advantages can be extracted from the description and the drawings. The features mentioned above and below may be used individually or in combination. The mentioned embodiments are not to be understood as exhaustive enumeration but have exemplary character.

BRIEF DESCRIPTION OF THE DRAWINGS

The schematic drawing shows two embodiments of the invention, which are explained in more detail below with reference to the figures of the drawing.

FIG. 1 shows a top view of a first sensor arrangement;

FIG. 2 shows a side view of the sensor arrangement of FIG. 1;

FIG. 3 shows a section through the sensor arrangement of FIG. 2 according to III-III;

FIG. 4 shows a section through a second sensor arrangement.

DETAILED DESCRIPTION

FIG. 1 shows a sensor arrangement 1 for measuring the temperature on a surface formed by the front screen 2 of a vehicle, which is almost planar. The sensor arrangement 1 has a temperature sensor 3 which is disposed on a circuit board 4 in the direct vicinity of a front end 4' of the circuit board 4. The front end 4' extends parallel to the surface of the front screen 2 along a tongue-shaped projection of the circuit board 4 and is positioned in the direct vicinity of the surface of the front screen 2. The circuit board 4 is surrounded by a housing 5 which is mounted to a rear mirror foot of a rear mirror of a vehicle, all not being shown in the figure. The housing 5 has an opening in the area of the projection 6.

A flexible heat conducting element 7 is disposed between the circuit board 4 and the surface of the front screen 2. The flexible L-shaped heat conducting element 7 is connected to the circuit board 4 and also abuts the surface of the front screen 2. The abutment is designed in a resilient fashion by means of the spring elements 8, such that the element 7 abuts the surface of the front screen 2 in the direction of the arrow 9 under pressure. The sensor arrangement 1 can therefore be pressed to the surface of the front screen 2 in a direction perpendicular to the surface of the front screen 2 without causing any damage, such that the temperature sensor 3 can be disposed at a defined separation from the surface of the front screen 2. The flexible heat conducting element 7 is shaped such that its surface contacting the surface of the front screen 2 is maximized or that the air gap between the heat conducting element 7 and the surface of the front screen 2 is minimized. This yields good thermal coupling between the surface of the front screen 2 and the flexible heat conducting element 7, which ensures that the flexible heat conducting element 7 has almost the same temperature as the surface of the front screen 2.

In an alternative fashion, the heat conducting element 7 can be designed in such a fashion that it is supported almost dot-like on one or more points on the surface of the front screen 2. This slightly reduces thermal coupling with the surface of the front screen 2, but uneven surfaces which are due to production and thus vary from screen to screen do not vary the thermal coupling.

The heat conducting element 7 is produced from metal, preferably copper or aluminium, or an alloy, preferably brass.

In accordance with FIGS. 2 and 3, the heat conducting element 7 and the circuit board 4 are pressed flatly against each other in the area of the temperature sensor 3. The force required for this purpose is provided by a resilient element designed as plastic tongues 10 and formed on the housing. These produce a force in the direction of arrow 11 which is large enough to generate a strong contact between the circuit board 4 and the heat conducting element 7. On the other hand, the force is selected such that the frictional force between the circuit board 4 and the heat conducting element 7 is smaller than the spring force of the tongues 10, such that the heat conducting element 7 can be moved perpendicularly to the surface of the front screen 2 in accordance with the double arrow 12.

The circuit board 4 is metalized in the area of the end face 4', on the lower side as well as on the side surfaces. This ensures excellent heat conduction between the circuit board 4 and the heat conducting element 7. One of the electric contacts of the temperature sensor 3 is connected to the end face of the circuit board 4 in an electrically conducting fashion. In an alternative fashion, the electric contact may also be connected to the lower side of the circuit board 4 via through connections. This particularly facilitates adjustment of the temperature of the temperature sensor 3 to the temperature of the heat conducting element 7.

The sensor arrangement shown in the figures permits mounting using a bayonet catch, since the robust heat conducting element 7 ensures that displacement or rotation of the sensor arrangement along the surface of the front screen 2 does not normally damage the front screen 2.

Further sensors as well as an evaluation unit may be disposed on the circuit board 4. The further sensors may comprise a temperature sensor 3' for measuring the temperature of the interior, and an air humidity sensor. The two further sensors may be used together with the temperature sensor for measuring the surface temperature in order to determine the fogging-up tendency of the front screen.

In accordance with FIG. 4 (analog to FIG. 3), the resilient, pressurized abutment of the heat conducting element 7 on the circuit board 4 may alternatively also be formed by an elastic housing membrane 13. By means of the housing membrane 13, a pin 14 is pressed against the lower side of the heat conducting element 7 in the direction of the arrow 15.

What is claimed is:

1. Sensor apparatus for measuring the temperature of a pane surface comprising:
   a temperature sensor mounted to a circuit board and positioned in a front end of the circuit board in the direct vicinity of the pane surface to be measured; and
   a flexible heat conducting element disposed between the surface to be measured and the circuit board in order that heat from the pane surface is transferred to the temperature sensor via the flexible heat conducting element and the circuit board and the temperature sensor measures the temperature of the pane surface.

2. Sensor apparatus according to claim 1, wherein the flexible heat conducting element is L-shaped and has a leg that is in contact with the surface to be measured, and a leg that is in flat contact with the circuit board.

3. Sensor apparatus according to claim 2, wherein a front side of the flexible heat conducting element, associated with the surface, has a smooth surface and is rounded at least at edges thereof.

4. Sensor apparatus according to claim 2, wherein the flexible heat conducting element comprises a heat conducting metal selection from a group consisting of copper, aluminium, brass, and bronze.

5. Sensor apparatus according to claim 2, further comprising means for providing resilient abutment of the heat conducting element on the surface.

6. Sensor apparatus according to claim 2, wherein the circuit board and the flexible heat conducting element flatly abut each other in the area of the temperature sensor.

7. Sensor apparatus according to claim 1, wherein the heat conducting element is displaceable with respect to the surface.

8. Sensor apparatus according to claim 1, wherein the circuit board is metalized at the front end, on a side opposite to the temperature sensor and on side surfaces and includes conductor paths for the temperature sensor.

9. Sensor apparatus according to claim 8, further comprises through connections in the circuit board in the vicinity of the temperature sensor.

10. Sensor apparatus according to claim 1 further comprising an evaluation unit disposed on the circuit board.

* * * * *